Feb. 4, 1969    A. BARZ    3,425,281
VACUUM GAUGE APPARATUS
Filed Jan. 10, 1966
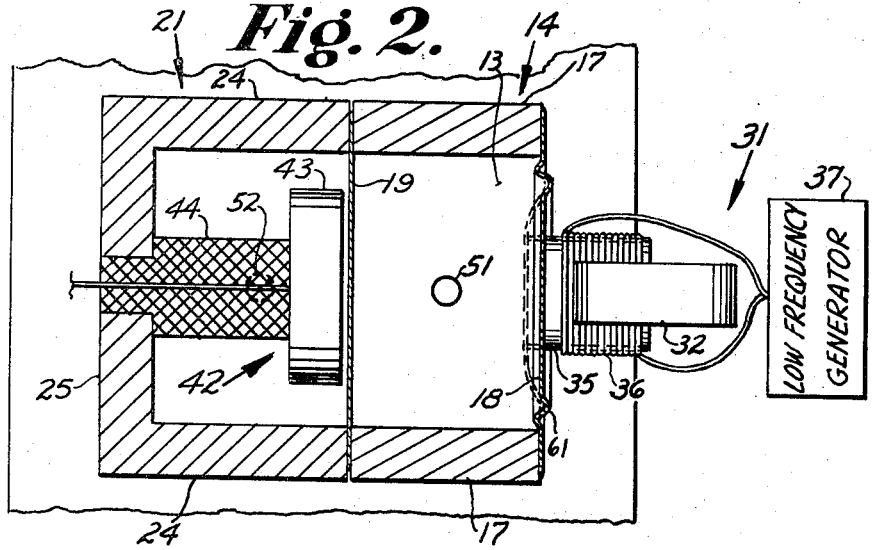
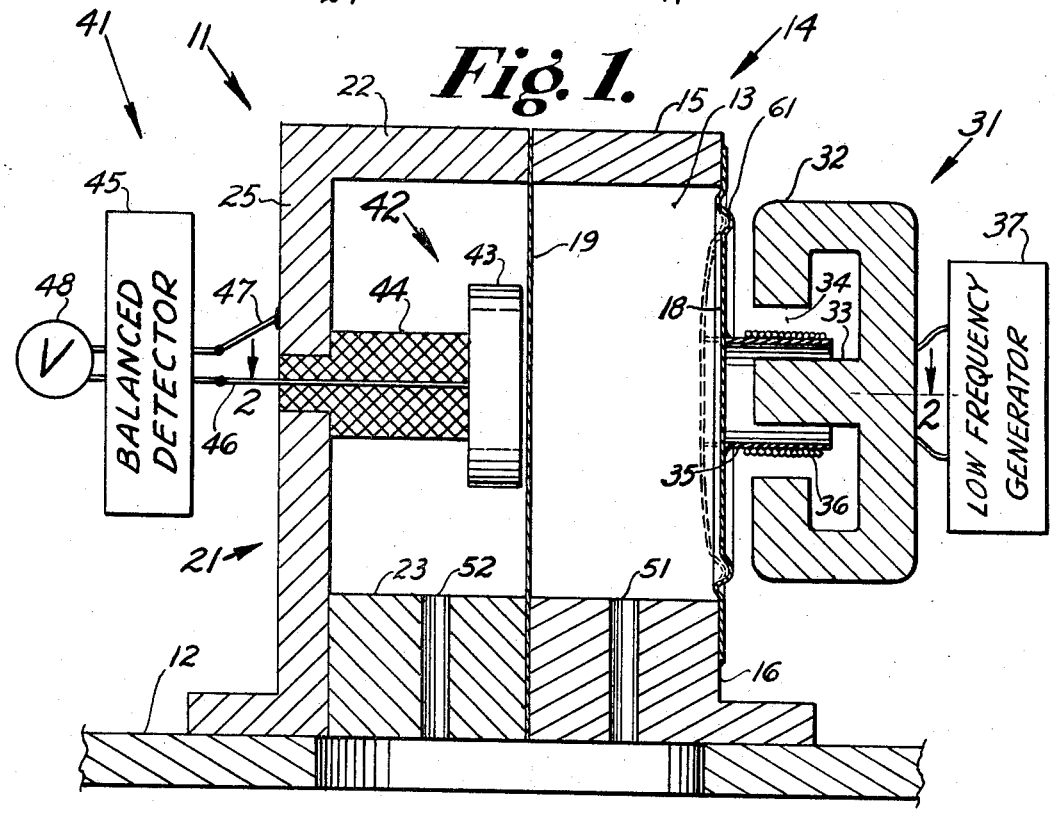
INVENTOR:
Alfred Barz
BY John E. Toupal
ATTORNEY.

United States Patent Office 3,425,281
Patented Feb. 4, 1969

3,425,281
VACUUM GAUGE APPARATUS
Alfred Barz, Cologne-Sulz, Germany, assignor to Leybold Holding Atkiengesellschaft, a Swiss joint-stock company
Filed Jan. 10, 1966, Ser. No. 519,645
Claims priority, application Germany, Jan. 15, 1965, L 49,723
U.S. Cl. 73—398
Int. Cl. G01l 9/12
9 Claims

ABSTRACT OF THE DISCLOSURE

The gauge housing structure defines a test chamber and an auxiliary chamber separated by a flexible membrane. When the gauge is connected to a vessel for the purpose of measuring the pressure therein, those chambers are communicated with the vessel by independent passages. The test chamber also includes a movable wall portion, to which is attached the armature of a drive mechanism. Surrounding the armature is an electrical winding of a low frequency generator which coacts with a fixed permanent magnet to produce periodic movement of the movable wall portion so as to cause periodic variation in the size of the test chamber. A sensing circuit includes a capacitor having a fixed electrode within the auxiliary chamber, the other electrode being defined by the flexible membrane separating the chambers. The capacitor is coupled to a balanced detector; and a volt meter is coupled to the output of the balanced detector. The conductances of the independent passages connecting the two chambers with the vessel are in the same ratio as the volume of the two chambers. The drive mechanism is energized by an alternating current of constant magnitude to exert a periodic force of constant magnitude in the movable wall portion. The resulting movement of the flexible membrane produces a capacitance change which is detected in the balance detector, and the detector output signal measured by the volt meter is proportional to the total gas pressure in the vessel.

---

This invention relates generally to vacuum gauge and more particularly to a vacuum gauge for directly measuring total pressure in the medium vacuum range.

Numerous measuring devices have been developed which measure pressure acceptably in the regions of both low and high vacuum. Conversely, exact pressure measurement in the medium vacuum region, for example, between 100 and $10^{-2}$ torr presents substantial difficulties. One type of instrument used to measure pressure in this region employs a flexible membrane which is deflected by a test volume to provide a direct indication of volume pressure. Elimination of temperature influences so as to provide linear characteristics for these devices requires rather complicated and costly structural arrangements. Several instruments which utilize pressure-dependent gas characteristics also are used to measure pressure in the medium vacuum pressure region. These include the Pirani gauge which employs the pressure dependence of heat conduction and certain rotary impeller systems which are actuated by a constant drive force and employ the pressure dependence of friction to measure pressure. Also known are acoustic instruments which utilize the gas pressure dependence of sound conductance to provide pressure measurements.

However, all the known methods of measuring pressure in the medium vacuum range possess inherent disadvantages which result directly from the particular measuring principle being used. These disadvantages include, for example, nonlinearity of measuring signal which necessitates unfavorable scales with crowded end ranges, secondary condition effects which reduce measuring sensitivity, a non-uniform dependence on all gases which prevents total pressure measurement, etc.

The object of this invention, therefore, is to provide an improved, total pressure vacuum gauge which is uniformly sensitive to all gases and which exhibits a high degree of measuring accuracy and sensitivity in the medium vacuum range.

One feature of this invention is the provision of a vacuum gauge having a variable test volume in gas communication with the system being measured and a drive mechanism for exerting a periodic and constant force. The applied force produces a periodic compression of the test volume and a resultant pressure rise which, in the medium vacuum pressure region, is proportional to the original equilibrium pressure in the test volume. Thus, by continually monitoring the pressure changes produced by the constant and periodic applied force, one obtains a measurement which is proportional to system pressure.

Another feature of this invention is the provision of a vacuum gauge of the first featured type wherein the driving mechanism comprises an electrical transducer having an armature connected to a movable wall portion of the test volume.

Another feature of this invention is the provision of a vacuum gauge of the above featured types including an electrical generator which energizes the transducer with an alternating current of constant amplitude thereby providing the periodic and constant force for compressing the test volume.

Another feature of this invention is the provision of a vacuum gauge of the above featured types wherein the test volume pressure measurements are obtained with an electrical capacitor having one electrode formed by a flexible membrane wall portion of the test volume. Changes in test volume pressure cause movement of the flexible membrane so that the resultant change in electrical capacitance is a measurement of the pressure change.

Another feature of this invention is the provision of a vacuum gauge of the above featured type including a frequency detector circuit coupled to the electrical capacitor and adapted to measure the changes in capacitance thereof.

Another feature of this invention is the provision of a vacuum gauge of the above featured type including an auxiliary housing which encloses that portion of the test volume exterior wall formed by the flexible capacitor membrane. The auxiliary housing permits an adjustment and control of the exterior pressure which opposes movement of the capacitor membrane during changes in test volume pressure.

Another feature of this invention is the provision of a vacuum gauge of the above featured type wherein the auxiliary housing is adapted to receive gas communication from the system being measured and thereby insures the existence of an equal equilibrium pressure on each side of the capacitor membrane.

Another feature of this invention is the provision of a vacuum gauge of the above featured type wherein the ratio of the volumes enclosed by the test housing and auxiliary housing is substantially equal to the ratio of the gas conductances joining these housings to the vacuum system being measured. This relationship prevents transient inequalities in the gas pressure on opposite sides of the capacitor membrane and the pressure measurement errors that would result therefrom.

Another feature of this invention is the provision of a vacuum gauge of the above featured types including a biasing arrangement which exerts on the test volume movable wall a force tending to restore its equilibrium position. The biasing arrangement compensates for the inertial forces in the movable wall generated during movement produced by the electrical drive mechanism.

These and other objects and features of the present invention will become more apparent upon a perusal of the following specification taken in conjunction with the accompanying drawings wherein:

FIG. 1 is a cross sectional side view, partly schematic, of a preferred vacuum gauge embodiment of the invention; and FIG. 2 is a cross sectional view of the vacuum gauge shown in FIG. 1 taken along lines 2—2.

Referring now to the figures there is shown the vacuum gauge 11 connected for gas communication with the partially shown vacuum chamber 12. Enclosing the test volume 13 is the test housing 14 including metal top 15 and bottom 16 walls and a pair of side walls 17. The other side walls of the test housing 14 are formed by the relatively thin movable wall portion 18 and the flexible membrane 19.

The auxiliary housing 21 is formed by top wall 22, bottom wall 23 and side walls 24 which abut the corresponding walls of the test housing 14. The other sides of the auxiliary housing 21 are closed by the end wall 25 and the flexible membrane 19.

The drive mechanism 31 includes a permanent magnet having end pole pieces 32 separated from the center pole piece 33 by the gaps 34. Positioned within the gaps 34 is the cylindrical metal armature 35 which is attached to the movable wall portion 18. Surrounding the armature 35 is the electrical winding 36 connected to the low frequency generator 37.

The sensing circuit 41 includes the capacitor 42 having electrodes formed by the capacitor plate 43 and the spaced flexible membrane 19. The capacitor plate 43 is enclosed by the auxiliary housing 21 and is supported from the end wall 25 by the electrical insulator 44. Coupling the capacitor 42 to the balanced detector 45 are the electrical feed through 46, connected to the capacitor plate 43 and insulated from the auxiliary housing 21 by the electrical insulator 44, and the electrical lead 47 connected to the flexible membrane 19 by the electrically conductive auxiliary housing 21. The voltmeter 48 is coupled to the output of the balanced detector 45.

During operation of the vacuum gauge 11 the flanged housings 14 and 21 are mounted over an aperture in the vacuum chamber 12 for which the pressure is to be measured. The test tubulation channel 51 in the bottom wall 16 provides gas communication between the vacuum chamber 12 and the test housing 14 while the auxiliary tubulation channel 52 in the bottom wall 23 provides gas communication between the vacuum chamber 12 and the auxiliary housing 21. Thus, equal gas pressures are established in the three chambers. Upon energization of the electrical winding 36 by the low frequency generator 37, the armature 35 reciprocates within the gaps 34 under the influence of the magnetic field produced by the permanent magnet 32, 33. The corresponding reciprocation of the attached movable wall portion 18 produces a periodic diminishing of the test volume 13 enclosed by the test housing 14. This in turn creates a periodic compression of the gas within the test housing 14 and the resultant increase in gas pressure is proportional to the original gas pressure therein when that original pressure lies in the medium vacuum pressure region. Each pressure rise also produces a differential pressure across the flexible membrane 19 causing it to move a distance which is also proportional to the pressure rise and consequently to the original equilibrium pressure in the test housing and the chamber 12. Similarly, the movement of the flexible membrane 19 produces a capacitance change in the capacitor 42 which is connected to influence the output frequency of a common oscillator included in the balanced detector circuit 45. The magnitude of the direct current output voltage from the balanced detector 45 is dependent upon the change in oscillator output frequency produced by the movement of the flexible capacitor membrane 19. Thus, this output signal, as measured by the voltmeter 48, is itself proportional to the total gas pressure in the vacuum chamber 12.

The auxiliary housing 21 in gas communication with the vacuum chamber 12 prevents the occurrence of an undesirable differential pressure across the flexible membrane 19 when equilibrium pressure exists in the vacuum chamber 12 and the test housing 14. In this regard, it is preferred that the volume ratio of the test housing 14 and the auxiliary housing 21 be substantially equal to the gas conductance ratio of the test tubulation channel 51 and the auxiliary tubulation channel 52. This feature insures equal rates of pressure change within the test and auxiliary housings 14 and 21 in response to a pressure change in the vacuum chamber 12. Thus, there will exist across the flexible membrane 19 no transient differential pressures which would generate transient errors in the pressure measurements recorded by the voltmeter 48.

It is also preferred, in the interest of accuracy and sensitivity, that the inertial forces acting on the driven movable wall portion 18 be restricted to a relatively low level. The spring members 61, which connect the movable wall portion 18 to the test housing side walls, bias the wall portion 18 toward its non-energized position and thereby compensate the inertial forces. Also, the mass of the test housing 14 provided by the top and bottom walls 15 and 16 and the side walls 17 is large compared to the mass of the movable wall portion 18.

Another useful feature can be used to prevent the occurrence of possible periodic gas pressure equalization in the test housing 14 and the vacuum chamber 12 during movement of the movable wall 18 (i.e., during the periodic variation in size of test volume 14). Such pressure balances would decrease the absolute value of the pressure change in the test housing 14 and thus reduce gauge sensitivity. This embodiment utilizes a test tubulation channel 51 designed as a "Helmholtz" resonator and having a frequency substantially below that of the generator 37.

Obviously, many modifications and variations of the present invention are possible in light of the above teachings. It is therefore, to be understood that within the scope of the appended claims the invention may be practiced otherwise than as specifically described.

What is claimed is:

1. A vacuum gauge apparatus comprising a test housing which defines a test volume, said test housing having a movable wall portion which permits variation in size of said test volume, sensing means associated with said test housing and adapted to measure the gas pressure in said test volume, and driving means associated with and adapted to produce periodic movement of said movable wall portion so as to cause periodic variation in size of said test volume, said driving means comprising an electrical transducer having an armature connected to said movable wall portion, and means for connecting said test volume to a vacuum chamber so as to provide gas communication therewith and for preventing pressure equalization therebetween during the periodic variation in size of said test volume.

2. A vacuum gauge apparatus according to claim 1 including an electrical generator adapted to generate an alternating current of constant amplitude and connected so as to provide energization of said armature.

3. A vacuum gauge apparatus comprising a test housing which defines a test volume and which is adapted for connection to a vacuum chamber so as to provide gas communication therewith, said test housing having a movable wall portion which permits variation in size of said test volume, sensing means associated with said test housing and adapted to measure the gas pressure in said test volume, said sensing means comprising an electrical capacitor having a flexible membrane electrode which forms a wall portion of said test housing, said sensing means further comprising an electrical detector circuit adapted to provide an output signal having a magnitude proportional to the capacitance of said electrical capacitor, driving means associated with and adapted to produce periodic movement of said movable wall portion so as to cause periodic variation in size of said test volume, said driving means comprising an electrical transducer having an armature connected to said movable wall portion which is adapted to exert a periodic force of constant magnitude on said movable wall portion.

4. A vacuum gauge apparatus according to claim 3 including an electrical generator adapted to generate an alternating current of constant amplitude and connected so as to provide energization of said armature.

5. A vacuum gauge apparatus according to claim 4 including an auxiliary housing enclosing the portion of said test housing exterior wall formed by said flexible membrane.

6. A vacuum gauge apparatus according to claim 5 wherein said auxiliary housing is adapted to receive gas communication from the vacuum chamber connected to said test housing.

7. A vacuum gauge apparatus according to claim 6 wherein said test housing is adapted for connection to the vacuum chamber by a test tubulation and said auxiliary housing is adapted for connection to the vacuum chamber by an auxiliary tubulation and wherein the ratio of the volumes enclosed by said test and auxiliary housings is substantially equal to the ratio of the gas conductances of said test and auxiliary tubulations.

8. A vacuum gauge apparatus comprising a test housing which defines a test volume and which is adapted for connection to a vacuum chamber by a test tubulation so as to provide gas communication therewith, said test housing having a movable wall portion which permits variation in the size of said test volume, driving means associated with and adapted to produce periodic movement of said movable wall portion so as to cause periodic variation in size of said test volume, sensing means associated with said test housing and adapted to measure the gas pressure in said test volume, said sensing means comprising an electrical capacitor having a flexible membrane electrode which forms a wall portion of said test housing, an auxiliary housing enclosing the portion of said test housing exterior wall formed by said flexible membrane electrode, said auxiliary housing being adapted for connection to the same vacuum chamber by an auxiliary tubulation so as to provide gas communication therewith, the ratio of the volumes enclosed by said test and auxiliary housings being substantially equal to the ratio of the gas conductances of said test and auxiliary tubulations.

9. A vacuum apparatus according to claim 8 wherein said sensing means further comprises an electrical detector circuit adapted to provide an output signal having a magnitude proportional to the capacitance of said electrical capacitor.

References Cited

UNITED STATES PATENTS 3,295,360   1/1967   Dimeff _____ 73—398

FOREIGN PATENTS 825,177   12/1951   Germany.

OTHER REFERENCES

Janssen, abstract of application Serial No. 136, 212, Published Oct. 28, 1952 in the O. G.

LOUIS R. PRINCE, *Primary Examiner.*

D. O. WOODIEL, *Assistant Examiner.*